(12) United States Patent
Van Bommel et al.

(10) Patent No.: US 12,508,335 B2
(45) Date of Patent: Dec. 30, 2025

(54) LIGHT EMITTING SYSTEM FOR DISINFECTING A TARGET AREA

(71) Applicant: SIGNIFY HOLDING B.V., Eindhoven (NL)

(72) Inventors: Ties Van Bommel, Horst (NL); Robert Jacob Pet, Waalre (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 349 days.

(21) Appl. No.: 18/273,298

(22) PCT Filed: Jan. 11, 2022

(86) PCT No.: PCT/EP2022/050379
§ 371 (c)(1),
(2) Date: Jul. 20, 2023

(87) PCT Pub. No.: WO2022/157030
PCT Pub. Date: Jul. 28, 2022

(65) Prior Publication Data
US 2024/0082441 A1    Mar. 14, 2024

(30) Foreign Application Priority Data

Jan. 21, 2021 (EP) .................................. 21152661

(51) Int. Cl.
*A61L 2/10* (2006.01)
*A61L 2/08* (2006.01)

(52) U.S. Cl.
CPC ................ *A61L 2/10* (2013.01); *A61L 2/084* (2013.01); *A61L 2202/11* (2013.01); *A61L 2202/14* (2013.01)

(58) Field of Classification Search
CPC ......... A61L 2/10; A61L 2/084; A61L 2202/14
See application file for complete search history.

(56) References Cited

U.S. PATENT DOCUMENTS

| | | | |
|---|---|---|---|
| 2,198,867 A | 4/1940 | Fair et al. | |
| 2008/0187190 A1 | 8/2008 | Shin et al. | |
| 2015/0041679 A1 | 2/2015 | Deal | |
| 2015/0062893 A1 | 3/2015 | Lynn et al. | |
| 2018/0193501 A1 | 7/2018 | Ufkes | |

(Continued)

FOREIGN PATENT DOCUMENTS

WO    2020242227 A1    12/2020

*Primary Examiner* — Nicole M Ippolito

(57) ABSTRACT

A light emitting system (1) for disinfecting a target area (5), the light emitting system (1) comprising a first light emitting device (2) comprising a first light source (21) configured to, in operation, emit a first UV light beam (22) towards the target area (5), and a second light emitting device (3) comprising a second light source (31) configured to, in operation, emit a second UV light beam (32) towards the target area (5), the first light emitting device (2) and the second light emitting device (3) being arranged spaced apart from one another in a direction perpendicular to vertical, and the first light source (21) and the second light source (31) being arranged such that, in operation, the first UV light beam (22) and the second UV light beam (32) are emitted in such respective directions that the first UV light beam and the second UV light beam form an exposure overlap at the target area.

15 Claims, 2 Drawing Sheets

(56) References Cited

U.S. PATENT DOCUMENTS

| | | |
|---|---|---|
| 2018/0209730 A1 | 7/2018 | Sun et al. |
| 2019/0083667 A1 | 3/2019 | Hawkins et al. |
| 2019/0209718 A1 | 7/2019 | Church et al. |
| 2019/0216959 A1 | 7/2019 | Mochizuki |
| 2020/0179543 A1 | 6/2020 | Deshays et al. |
| 2020/0179544 A1 | 6/2020 | Ufkes |
| 2020/0331611 A1 | 10/2020 | Hack et al. |
| 2022/0211897 A1* | 7/2022 | Wills, Jr. ............. B01D 53/007 |
| 2022/0265889 A1* | 8/2022 | Bergenek ................ F21S 8/061 |
| 2022/0347329 A1* | 11/2022 | Ramer ...................... A61L 2/24 |

\* cited by examiner

LIGHT EMITTING SYSTEM FOR DISINFECTING A TARGET AREA

CROSS-REFERENCE TO PRIOR APPLICATIONS

This application is the U.S. National Phase application under 35 U.S.C. § 371 of International Application No. PCT/EP2022/050379, filed on Jan. 11, 2022, which claims the benefit of European Patent Application No. 21152661.1, filed on Jan. 21, 2021. These applications are hereby incorporated by reference herein.

FIELD OF THE INVENTION

The invention relates to a light emitting system for disinfecting a target area. The light emitting system comprises a first luminaire comprising a first light source configured to, in operation, emit a first UV light beam towards the target area, and a second luminaire comprising a second light source configured to, in operation, emit a second UV light beam towards the target area.

As used herein the terms "the vertical" and "vertical direction" is intended to refer to the direction aligned with the direction of the force of gravity, up or down, as materialized e.g. with a plumb line.

BACKGROUND OF THE INVENTION

Ultraviolet (UV) disinfection is a method that uses UV light to kill or inactivate microorganisms by destroying nucleic acids and disrupting their DNA, leaving them unable to perform vital cellular functions. UV disinfection is used to disinfect (operating) rooms in hospitals. Given the recent COVID-19 developments, UV disinfection is being considered for several other applications.

Solutions for disinfecting using UV light have been presented, e.g. in US 20180193501 A1 which discloses a fixed position hybrid germicidal irradiation apparatus, method, and system for ultraviolet germicidal irradiation. A plurality of emitters may be coupled to a substantially rectangular housing configured to be coupled to a standard commercial lighting fitting. A second plurality of emitters may be coupled to the substantially rectangular housing. The first plurality of emitters and the second plurality of emitters are operable to emit UV-C radiation at a wavelength of about 265 nanometers and near-UV radiation at a wavelength of about 405 nanometers respectively. UV-C sensors are configured to measure the amount of UV-C light or near UV-C light from a target surface. A controller may be configured to engage with the UV-C sensors to determine the amount of UV-C radiation collected by the UV-C sensors.

However, the solutions presented in the prior art are ambiguous and may expose persons for UV-C radiation. Also, a part of an object exposed to UV radiation using the known systems may be in shadow and thus left at least partially unexposed and undisinfected. Consequently, there is still a need for alternative solutions for disinfecting using UV radiation.

Furthermore, there is a desire to provide a solution for disinfecting using UV radiation which is improved as regards at least one of safety and performance.

U.S. Pat. No. 2,198,867 discloses an apparatus for protecting from infection by micro-organisms an object exposed to such infection in the lower region of an air-containing room having, in combination, a source of ultraviolet light of 280 nm or less positioned in an upper region of the room, the ultraviolet light emitted by the source being free to irradiate the whole said upper region of the room, whereby the major portion of the microorganisms is subjected to the action of the ultraviolet light and will be killed almost immediately

SUMMARY OF THE INVENTION

It is an object of the present invention to provide an alternative solution for UV disinfection and, and to provide a disinfection light emitting system with improved safety and improved performance of UV disinfection.

According to a first aspect of the invention, this and other objects are achieved by a light emitting system configured to emit radiation into a main average issue direction for disinfecting a target area, the light emitting system comprising a first luminaire comprising a first light source configured to, in operation, emit a first UV light beam towards the target area, and a second luminaire comprising a second light source configured to, in operation, emit a second UV light beam towards the target area, where the first luminaire and the second luminaire are arranged spaced apart at a first distance from one another, and where the first light source and the second light source are arranged such that, in operation, the first UV light beam and the second UV light beam are emitted in such respective directions that the first UV light beam and the second UV light beam form an exposure overlap at the target area.

The thus provided exposure overlap between the first UV light beam and the second UV light beam at the target area provides for improved disinfecting of objects placed in the target area within the overlap as two UV light beams can be more efficient than one. Further, since the first luminaire and the second luminaire are spaced apart, and the UV light beams are directed towards the target area, UV radiation is provided from different positions, which may reduce shadows on the object placed in the target area and less UV light beam exposed surfaces of objects within the overlap.

Consequently, the spaced apart luminaires may facilitate better disinfection of side surfaces of an object within the target area and of surfaces of non-plane objects such as tools, headgear and the like. The UV light beams being directed at the target area further provides for that the surrounding area around the target area is less exposed to UV radiation, thereby limiting the exposure of UV radiation to objects and/or people in the surrounding area and making for a safer working environment.

Thus, a disinfection light emitting system with improved safety and improved performance of UV disinfection is provided for.

In an embodiment, the exposure overlap between the first UV light beam measured at FWHM and the second UV light beam measured at FWHM is at least 50%, at least 70% or at least 80%.

In an embodiment a center of the exposure overlap between the various UV light beams, i.e. the first, second and where provided third and further UV light beams, measured at FWHM at the target area is at least 90%, 95% or 98%.

In an embodiment a center of the exposure overlap between the various UV light beams, i.e. the first, second and where provided third and further UV light beams, measured at FWHM at the target area is in the range of 90% to 100%.

FWHM is an abbreviation of full width at half maximum and is a common form of measurement for pulse waveforms, and the spectral width of sources used for optical communications. The significant exposure overlap between the UV light beams may provide for a higher success rate in placing and disinfection of objects, as a greater exposure overlap may create a larger area wherein an object would be exposed to UV radiation from two UV light beams. Also, the significant exposure overlap provides for a particularly high UV light concentration in the overlap area and thus an even more improved performance in disinfection.

Having an exposure overlap in the range of 40%-60% e.g. 50% facilitates a rather constant UV light intensity at and around an object positioned in the target area. The exposure overlap being in the range of 40%-60% provides a potentially broad area of disinfection.

Having an exposure overlap in the range of 60%-90% e.g. 70% or 80% facilitates a rather constant UV light intensity at and around an object positioned in the target area and a high intensity overlap in a center of the target area. The exposure overlap being in the range of 40%-60% provides a potentially broad area of disinfection in combination with a highly efficient disinfection at the center of the target area.

Having an exposure overlap in the range of 90%-100% e.g. 95% or 98% facilitates a high intensity, potentially narrow, UV light at the target area. The exposure overlap being in the range of 90%-100% provides a a highly efficient disinfection at the center of the target area.

In an embodiment, the first luminaire further comprises a third light source configured to, in operation, emit a first white light beam towards the target area, and the second luminaire further comprises a fourth light source configured to, in operation, emit a second white light beam towards the target area.

The white light beam emitted towards the target area can enlighten the target area, as well as part of the surrounding area, which makes the target area more visible and, thus makes it easier to correctly place and subsequently remove objects from the target area. Further, as white light is visible light, the white light makes it possible to assess whether the light emitting system is turned on or off with the naked eye. Consequently, the white light may improve the safety of the system and encourage users to turn off the system when not in use.

In an embodiment, the second light source and the fourth light source are arranged such that, in operation, the first white light beam and the second white light beam are emitted along mutually parallel directions of propagation.

In an embodiment, the first white light beam is emitted at an intensity different from an intensity of the second white light beam.

In an embodiment, the first white light beam is emitted at an intensity similar to or equal to an intensity of the second white light beam.

In an embodiment, the first white light beam and the second white light beam or any other light source emitting white light can be emitted in any direction. E.g. when mounted at a ceiling, the white light beams are emitted in the direction of the force of gravity.

Main direction of propagation should be understood as the direction of propagation of the part of a light beam having the highest intensity and thus typically the central part of the light beam.

The emission of the first and second white light beams being along mutually parallel directions of emissions provides for a uniform enlightenment of the target area and potentially around surrounding area. If the parallel directions are perpendicular to the installation surface of the luminaire the white light will be distributed equally on the surface opposite to the installation surface. By having a uniform distribution of white light at, and potentially around, the target area, it becomes easier to determine where the target area is, as it will be in the overlap between the white light, which may improve safety and usability of the system.

In an embodiment, a white light overlap at the target area between the first white light beam measured at FWHM and the second white light beam measured at FWHM is less than 20%, less than 10% or less than 5%.

Having a small overlap of the first and second white light beam measured at FWHM results in little or even no glare at the target area, which improves the usability of the system and make it safer to use. The small white light overlap further results in more of the area around the target area to be enlightened by the white light and thus results in greater visibility of the areas as a whole.

In an embodiment, the light emitting system comprises at least one further luminaire spaced apart from the first luminaire at a second distance D2, the at least one further luminaire comprising a fifth light source configured to, in operation, emit a third UV light beam towards the target area, the at least one further luminaire is arranged spaced apart from the first luminaire and the second luminaire, and the fifth light source is arranged such that, in operation, the third UV light beam, the first UV light beam and the second UV light beam are emitted in such respective directions that the third UV light beam, the first UV light beam and the second UV light beam form the exposure overlap at the target area.

The second distance D2 may be the same as the first distance D1. The second distance D2 may be different from the first distance D1.

At least three UV light beams enhances the performance of the first UV light beam and the second UV light beam, as the target area may be exposed to more UV radiation, which may improve a disinfection rate of the system and/or reduce shadows on objects placed at the target area.

In an embodiment, the third luminaire may be spaced apart from the second luminaire at a third distance D3, which is equal to D1 or different from D1.

In an embodiment, the exposure overlap between the first UV light beam measured at FWHM, the second UV light beam measured at FWHM, and the third UV light beam measured at FWHM is at least 50%, at least 60%, at least 70%, at least 75% or at least 80%.

The significant exposure overlap between the at least three UV light beam provides for further improving the disinfection of an object on a plurality of surfaces when placed in the target area.

In one embodiment, the at least one further luminaire further comprises a sixth light source configured to, in operation, emit a third white light beam towards the target area, the sixth light source being arranged such that, in operation, the third white light beam, the first white light beam and the second white light beam are emitted along mutually parallel directions of emission.

In an embodiment, the third white light beam is emitted at a different intensity than the first white light beam.

In an embodiment, the third white light beam is emitted at an intensity similar to an intensity of the first white light beam.

In an embodiment, the first luminaire and the second luminaire are arranged spaced apart from one another in a transverse direction.

In an embodiment, the first luminaire and the second luminaire are arranged spaced apart from one another by at least 30 cm, 50 cm, 100 cm, 150 cm, 200 cm or 250 cm. The spacing between the first luminaire and the second luminaire can e.g. reduce potential shadows on an object positioned in the target area.

In an embodiment, the first white light beam, the second white light beam and the third white light beam can be emitted in any direction e.g. when mounted at a ceiling, the white light beams are emitted in gravitational direction.

A third white light beam emitted towards the target area further improves the visibility of the target area and help enlighten the entirety of the target area and some of the surrounding area.

In an embodiment, an overlap between the first white light beam, the second white light beam and the third white light beam is less than 20%, less than 10% or less than 5% measured at FWHM at the target area.

The relatively small white light overlap between the first white light beam, the second white light beam and the third white light beam results in a small amount of glare from the white light and in general reduces the reflections of the light from objects placed at or in proximity to the target area.

In one embodiment, the light emitting system further comprises a fourth luminaire comprising a seventh light source configured to, in operation, emit a fourth UV light beam towards the target area, where the at least one further luminaire is arranged spaced apart from the first luminaire, the second luminaire, and the third luminaire, and where the seventh light source is arranged such that, in operation, the fourth UV light beam, the first UV light beam, the second UV light beam and the third UV light beam are emitted in such respective directions that the third UV light beam, the first UV light beam, the second UV light beam and the third UV light beam form the exposure overlap at the target area.

By having four UV light beams overlapping at the target area, the disinfection of objects at the target area becomes even faster and even more effective as well as eliminate shadow on the surface of objects placed at the target area.

In still further embodiments, the light emitting system may in an analogous manner comprise further such luminaires.

In an embodiment, the exposure overlap between the first UV light beam measured at FWHM, the second UV light beam measured at FWHM, the third UV light beam measured at FWHM and the fourth UV light beam measured at FWHM is at least 50%, at least 70% or at least 80%.

The significant exposure overlap between the at least three UV light beam provides for an even further improvement of the disinfection of an object on a plurality of surfaces when placed in the target area.

It is thus feasible to provide in principle any number of such further luminaires, such as one, two, three or even more such further luminaires.

In an embodiment, the first luminaire comprises a first light exit surface, and the first luminaire is configured to, in operation, emit the first UV light beam at a first acute angle, $\alpha$, and the second luminaire comprises a second light exit surface, and the second luminaire is configured to, in operation, emit the second UV light beam at a second acute angle, $\beta$, and at least one of the first acute angle $\alpha$ and the second acute angle $\beta$ is larger than 15° relative to the main issue direction.

In an embodiment, the angle $\gamma$ between the direction of emission of the first UV light beam and the direction of emission of the second UV light beam is in the range of 10° to 100°, 20° to 90° or 30° to 80°.

In an embodiment, the first acute angle is different from 0° relative to a first axis being perpendicular to the first light exit surface, and the second acute angle is different from 0° relative to a second axis being perpendicular to the second light exit surface.

In an embodiment, $\alpha$ is 10°, 20°, 30°, 40°, 50°, 60°, 70°, or 80°.

In an embodiment, $\beta$ is −10°, −20°, −30°, −40°, −50°, −60°, −70°, or −80°.

In one embodiment, the third luminaire comprises a third light exit surface, and the third luminaire is configured to, in operation, emit the third UV light beam at a third acute angle, where at least one of the first, second and third acute angle is larger than 15° relative to the main issue direction In one embodiment, the third acute angle is 10°, 20°, 30°, 40°, 50°, 60°, 70°, or 80°.

In an embodiment, the third acute angle is different from 0° relative to a third axis being perpendicular to the third light exit surface, In one embodiment, the fourth luminaire comprises a fourth light exit surface, and the fourth luminaire is configured to, in operation, emit the fourth UV light beam at a fourth acute angle, where at least one of the first, second, third and fourth acute angle is larger than 15° relative to the main issue direction By at least two of the luminaires having an angle relative to an axis perpendicular to their respective light exit surface, it is provided that the UV light beams affect the target area and/or an object in the target area with angled UV light beams. Apart from allowing to obtain the desired overlap between the UV light beams, the use of angled UV light beams reduces shadows on the object and is therefore effective in disinfecting areas of the object otherwise lying fully or partially in shadow. By having more than two luminaires being angled relative to an axis perpendicular to their respective light exit surface shadows on surfaces of the object exposed to the UV light beams are reduced considerably or even eliminated.

In one embodiment, the first acute angle is equal to the second acute angle.

In one embodiment, the third acute angle is equal to the first acute angle.

In one embodiment, the fourth acute angle is equal to the first acute angle.

Consequently, the UV light beams are emitted at the same angle towards the target area, which creates a uniform UV radiation at the target area on an object irrespectively of how the object is placed at the target area. Thus, the usability and simplicity of use of the light emitting system is increased.

In an embodiment, the first light source is configured to, in operation, emit light with a first spectral distribution and the second light source is configured to, in operation, emit light with a second spectral distribution different from the first spectral distribution.

In an embodiment, the third light source is configured to, in operation, emit light with a third spectral distribution different from the first spectral distribution or second spectral distribution.

In an embodiment, the fourth light source is configured to, in operation, emit light with a fourth spectral distribution different from the first spectral distribution, second spectral distribution or third spectral distribution.

In an embodiment, the UV light beam(s) comprises UV-C light in the wavelength range of less than or equal to 280 nm, or in the range from 230-280 nm, or from 200 to 230 nm, or from 190 nm to 220 nm, or from 190 nm to 230 nm, or from 200 nm to 230 nm, or from 215 nm to 225 nm.

In an embodiment, the first UV beam and the second UV beam are far UVC light beams, thereby having a spectral distribution between 200-230 nm.

In an embodiment, the first UV beam is a far UVC light beam, thereby having a spectral distribution between 200-230 nm, and the second UV beam is a deep UVC light beam, thereby having a spectral distribution between 230-280 nm.

By providing UV light beams with different spectral distributions, a wide scope of use is possible, as the different spectral distributions can have different purposes, uses, or disinfection rates.

By providing UV light beams with the same spectral distribution, an efficient and uniform disinfection of an object in the target area may be facilitated.

In an embodiment, at least one of the UV light beams has a UV-A (315-380 nm), UV-B (280-315 nm), or UV-C (here 200-280 nm) wavelength range.

In an embodiment, one of the plurality of UV light beams has a wavelength range different from one or more of the other UV light beams.

Using UV-A provides a relatively safe UV light beam that can kill bacteria.

Using UV-C provides a UV light beam that can kill bacteria and viruses very efficiently.

Using UV-B provides a UV light beam that can be considered safe when only subjected to small doses. Further, a UV-B light beam can kill bacteria and viruses.

In an embodiment, the first UV light beam has a first main peak and the second UV light beam has a second main peak, wherein the first mean peak and the second mean peak differ by at least 50 nm, 75 nm or 100 nm in wavelength.

In an embodiment, the first main peak and the second main peak respective spectral distributions have a mutual overlap of up to 5%, 10% or 20%.

The UV light beams having different main peaks provide the ability of having different purposes for each of the UV light beams e.g. the first main peak being for killing bacteria and the second main peal being for killing virus.

In an embodiment, the direction of the first UV beam and the direction of the second UV beam are adjustable.

In an embodiment, the direction of the first UV beam and the direction of the second UV beam are adjustable independently of one another. By providing adjustable directions of the UV beams, the direction of emission of the UV beams may be adjusted to fit with objects of different sizes and positions, thus providing a more efficient disinfection.

UV-C light of a wavelength range of below 230 nm, and particularly below 220 nm, is regarded as safe with respect to damage to eyes and skin of humans. Using a light source emitting UV-C light of such a wavelength therefore provides for a luminaire which is further safe for disinfection of human skin surfaces, such as hands and arms and even faces.

The light source(s) adapted for, in operation, emitting white light may for instance be provided as white LEDs, as phosphor converted UV LEDs and/or blue LEDs or as RGB LEDs.

In an embodiment, the first white light beam and second white light beam have the same color temperature (CT) or correlated color temperature (CCT). Alternatively, the first white light beam and the second white light beam are mutually different in color temperature (CT) or correlated color temperature (CCT).

In one embodiment, the first white light beam is warm white (<3500K) and the second white light beam is cool white (>4000K)

In one embodiment, the third white light beam and the fourth white light beam have the same CT or CCT as the first or the second light beam. Alternatively, the third white light beam and the fourth white light beam have a CT or CCT being different from the CT or CCT of the first or the second light beam.

In an embodiment, the luminaire comprises a housing having a light exit window and at least one side wall, where the light emitting system is arranged within the housing such that the light sources of the light emitting system, in operation, emit light through the light exit window.

The luminaire, and especially the housing of the luminaire, may protect part of the light emitting system from outside influences, and it may reduce the risk of a position of a light source to be influenced by users or objects and it may provide for simple installation of the light emitting system.

It is noted that the invention relates to all possible combinations of features recited in the claims.

In an embodiment, the UV beams has a beam width at FWHM narrower than the beam width at FWHM of the white light beams.

In an embodiment, one of the light sources may be provided with lenses, reflectors, TIRS or the like for providing a desired beam shape or beam width on a surface whereon the beam shape is cast.

In an embodiment, the light exit surface is subdivided into two, three, four, five or more than five optical parts.

In an embodiment, lenses, reflectors, TIRS or dividing the light exit surface into multiple optical parts are used to manipulate at least one of the UV beam's width to be narrower than at least one of the white light beam's width.

Dividing the light exit surface into two, three, four, five or more than five optical parts can help manipulate a beam into having a desired beam shape or beam width.

In a further embodiment, the light exit surface is provided with an electrically and/or mechanically controllable optical element that is arranged to dynamically manipulate the beam with first spatial light distribution into a beam having a beam direction and a spatial light distribution different from said first spatial light distribution and/or manipulating the beam with the second spatial light distribution into a beam having a beam direction and a spatial light distribution different from said second spatial light distribution wherein the beam direction/spatial light distribution are adjustable such that in operation an at least partly overlap of the light distributions of the first and second luminaire is obtained at a target area or that the adjusted beams are complementary.

Being able to provide a desired beam shape or beam width provides a more customizable system where an exposure overlap can be designed to focus on the target area and reduce the part of the beam around or outside the target area.

Providing at least one UV beam with a narrower width than at least one white light beam may make it possible to enlighten the entirety of the UV beam with white light and make it easier to use, as it makes the UV beam visible. The white light may also remind users that the UV beam is active within the white light beam and thus help avoiding placement of objects not to be disinfected to be placed in the UV beam.

The lenses, reflectors, TIRS or dividing the light exit surface into multiple optical parts can be used to manipulate one or more UV beams or to manipulate the white light beams.

In an embodiment, lenses, reflectors, TIRS or dividing the light exit surface into multiple optical parts are used to manipulate at least one UV beam and lenses, reflectors, TIRS or dividing the light exit surface into multiple optical parts are used to manipulate at least one white light beam.

In an embodiment, a first collimator, such as a lens, is arranged and configured to collimate the first UV light beam and direct the first UV light beam onto an optical structure, such as a diffractive grating, provided and arranged to obtain a desired UV light pattern, and a second collimator, such as a reflector, is arranged and configured to collimate the second UV light beam.

Thereby, a light emitting system may be provided which is configured to provide a collimated UV light pattern superimposed on top of or complementary to a UV light spot or a diffuse UV light spot. Such a light emitting device makes it possible with a high degree of precision to irradiate different parts of an object with UV light having different wavelengths and/or intensities.

BRIEF DESCRIPTION OF THE DRAWINGS

This and other aspects of the present invention will now be described in more detail, with reference to the appended drawings showing embodiment(s) of the invention.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
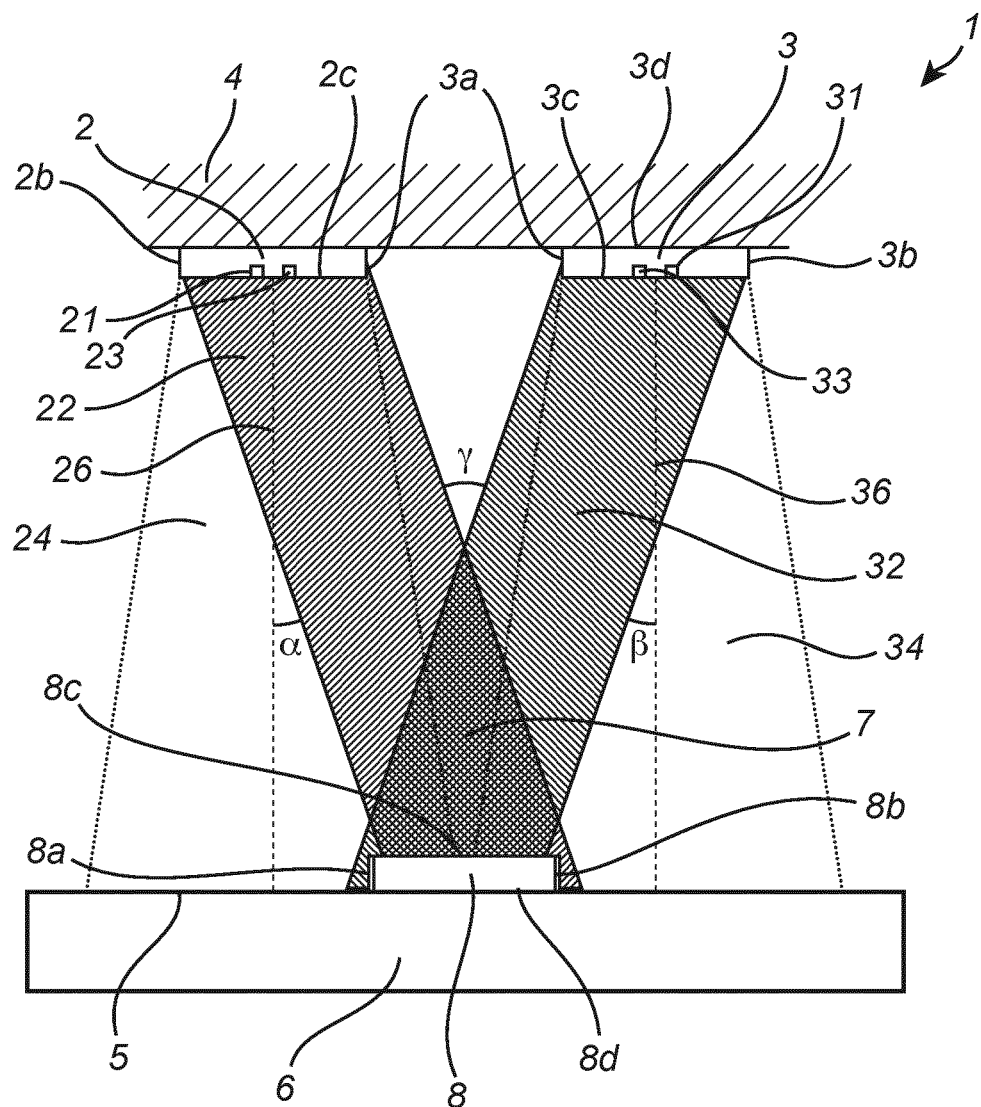
FIG. 1 shows a schematic cross-sectional side view of a light emitting system according to a first embodiment of the invention.

Referring initially to FIG. 1, a schematic cross-sectional view of a light emitting system 1 according to a first embodiment of the invention is shown. The light emitting system 1 comprises a first luminaire 2. The first luminaire 2 comprises a housing with a first side wall 2a, a second side wall 2b, a light exit surface 2c extending between the two side walls 2a, 2b and opposite of the light exit surface 2c a mounting surface 2d. The mounting surface 2d is mounted to a surface, which in the embodiment shown is a ceiling 4, and the light exit surface 2d faces downwards towards another surface, in the embodiment shown a floor 6. The light exit surface 2c may comprise an exit window for allowing light to travel through it. The first luminaire 2 has a UV light source 23 emitting a UV light beam 22 towards a target area 5. The UV light beam 22 is emitted in an emission angle α relative to a vertical axis 26 extending perpendicular to the major surface of the light exit surface 2c of the first luminaire 2. The emission angle α may for instance be 30 degrees. The target area 5 may be part of the floor 6. The target area 5 may also be a separate object placed on the floor 6. The first luminaire 2 further comprises a white light source 23 emitting a first white light beam 24 downwards towards the floor 6 in parallel to the vertical, and thus in a direction along the vertical axis 26 or in an angle perpendicular to the light exit surface 2c. The white light beam 24 and the UV light beam 22 partly overlap at the target area 5.

Still referring to FIG. 1, the light emitting system 1 comprises a second luminaire 3 constructed in a manner similar to the first luminaire 2. The second luminaire 3 thus comprises a housing with a first side wall 3a, a second side wall 3b, a light exit surface 3c extending between the two side walls 3a, 3b, and opposite the light exit surface 3c, a mounting surface 3d. The mounting surface 3d is mounted to a surface, which in the embodiment shown is the ceiling 4, and the light exit surface 3d faces downwards towards another surface, in the embodiment shown the floor 6. The light exit surface 3c may comprises an exit window for allowing light to travel through it. The second luminaire 3 is spaced apart from the first luminaire in a transverse direction. The second luminaire 3 comprises a UV light source 31 emitting an UV light beam 32 towards the target area 5. The UV light beam 32 is emitted at an emission angle β relative to a second vertical axis 36 extending perpendicularly to the light exit surface 3c of the second luminaire 3. The emission angle β relative to the vertical axis may for instance be 30 degrees. The second luminaire 3 further comprises a second white light source 33 emitting a second white light beam 34 downwards towards the floor 6 in parallel to vertical, and thus in a direction along the second vertical axis 36 parallel with the first vertical axis 26 which the first white light beam 24 is emitted along. The white light beam 34 and the UV light beam 32 partly overlap at the target area 7.

The first UV light beam 22 measured at FWHM and the second UV light beam 32 measured at FWHM has an UV overlap 7 of about 80% at the target area 5. The UV overlap can in variations of the light emitting system 1 be smaller or larger.

An object, particularly as shown a square shaped object 8, is positioned in the target area 5. As may be seen, a majority of a top surface 8c of the object 8, that faces towards the ceiling 4, is exposed to both the first UV light beam 22 and the second UV light beam 32, which heightens the disinfection rate. A first side wall 8a and a second side wall 8b of the object 8 as well as edges around the first side wall 8a and the second side wall 8b are exposed to one of the first UV light beam 22 and the second UV light beam 32.

There may be an overlap of the first white light beam 24 and the second white light beam 34 at the target area 5. The overlap between the first white light beam 24 measured at FWHM and the second white light beam 34 measured at FWHM, may be of less than 5%, if no object is present in the target area 5. Thus, the majority of the white light is illuminating the surrounding area around the target area 5.

Figure 2:
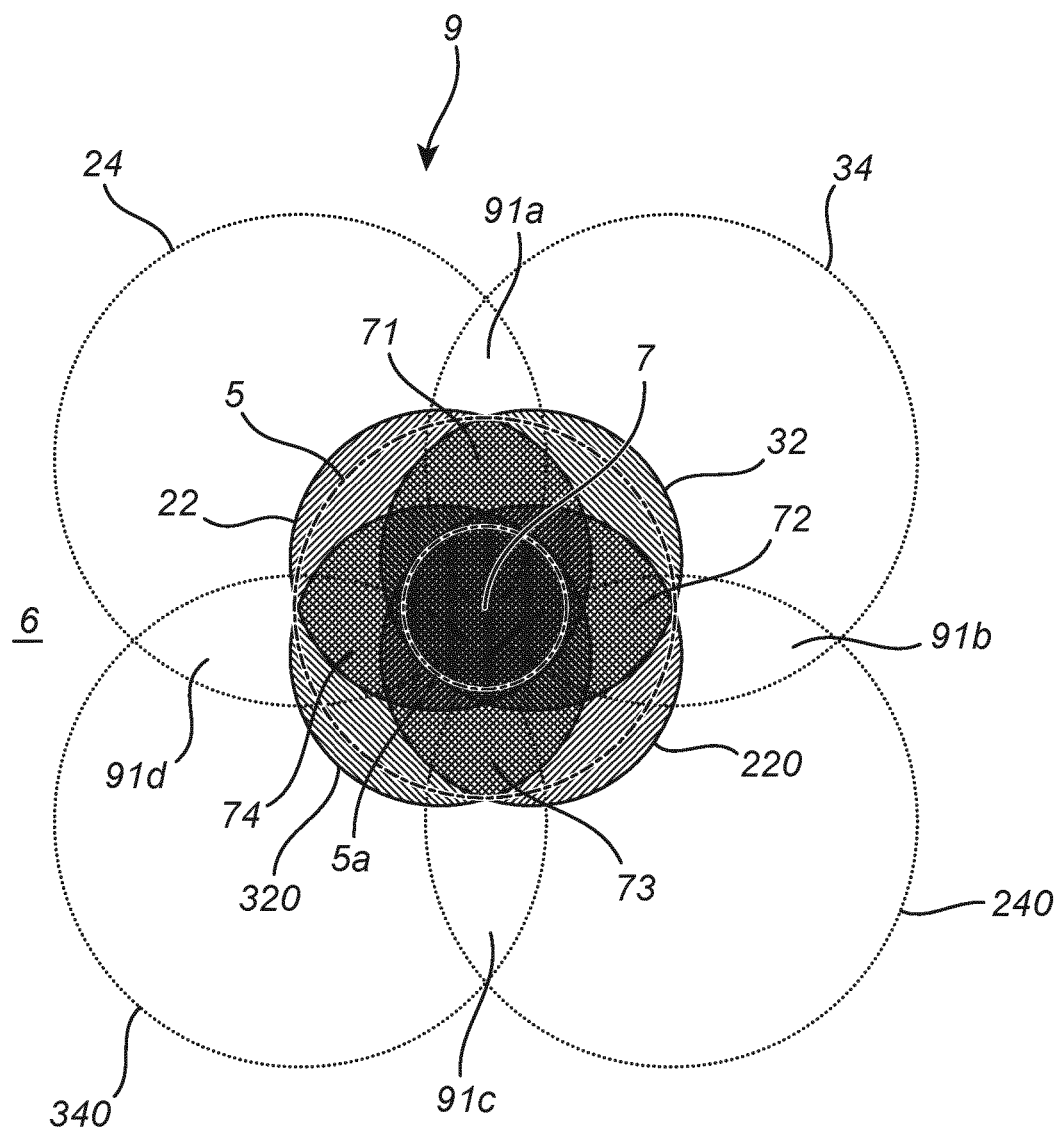
FIG. 2 shows a schematic illustration of a top view of an area illuminated by the light emitting system according to a second embodiment of the invention.

Now referring to FIG. 2, a schematic top view of an area 9 illuminated by a light emitting system according to a second embodiment of the invention is shown. The light emitting system itself is not shown on FIG. 2, but comprises four luminaires, each constructed similarly to the luminaires 2 and 3 described above. Thus, light emitting system used to produce the illumination illustrated in FIG. 2 comprises four UV light sources, each providing a UV light beam 22, 23, 220, 230, and four white light sources, each providing a white light beam 24, 34, 240, 340.

The first UV light beam 22, the second UV light beam 32, the third UV light beam 220 and the fourth UV light beam 320 are directed towards the target area 5. Each UV light beam 22, 32, 230, 330 is cone shaped and casts a circular UV light spot on the floor 6 as illustrated in FIG. 2. A part of each UV light beam is cast at the target area 5. A part of each UV light beam overlaps with at least one other UV light beam around the target area 5. A part of the UV light beam is not overlapping with any other UV light beam. The UV light beams 22, 32, 230, 330 overlap such that the first UV light beam 22 and the second UV light beam 32 has an UV overlap 71 at the target area 5, the second UV light beam 32 and the third UV light beam 220 has an UV overlap 72 at the target area 5, the third UV light beam 220 and the fourth UV light beam 320 has an UV overlap 73 at the target area 5, and the first UV light beam 22 and the fourth UV light beam 320 has an UV overlap 74 at the target area 5. All the UV overlaps 71, 72, 73, 74 have at least two UV light beams measured at FWHM overlapping. In a center 5a of the target area 5 the first UV light beam 22, the second UV light beam 32, the third UV light beam 220 and the fourth UV light beam 320 has a mutual UV center overlap 7. The remainder of each UV light beam 22, 32, 220, 320 measured at FWHM not being part of the UV center overlap 7 at the target area 5 nor overlapping with at least one other UV light beam, exposes areas around the target area for a single UV light beam.

Still referring to FIG. 2, the first white light beam 24, the second white light beam 34, the third white light beam 240 and the fourth white light beam 340 illuminate a part of the floor 6 comprising the UV overlapping areas. Each of the white light sources casts a circular white light beam on the floor 6, uniformly distributed at and around the target area 5, such that only a small part of each of the white lights 24, 34, 240, 340 overlap with at least one other white light at the target area 5. A part of each white light beam 24, 34, 240, 340 overlap with at least one other white light, such that the first white light beam 24 and the second white light beam 34 has a first white light overlap 91a, the second white light beam 34 and the third white light beam 240 has a second white light overlap 91b, the third white light beam 240 and the fourth white light beam 340 has a third white light overlap 91c and the fourth white light beam 340 and the first white light beam 24 has a fourth white light overlap 91d. A part of each white light overlap 91a, 91b, 91c, 91d overlaps within the target area 5, while part of each white light overlap 91a, 91b, 91c, 91d overlaps outside the target area 5. In FIG. 2 there is no area where all of the first white light beam 24, the second white light beam 34, the third white light beam 240 and the fourth white light beam 340 measured at FWHM does not overlap with each other. Further, the majority of the white light from the white light beams 24, 34, 240, 340 illuminates the floor 6 by non-overlapping white light.

The light emitting system used to produce the illumination illustrated in FIG. 2 may be constructed by adding to a light emitting system as shown in FIG. 1 and described above a third luminaire and a fourth luminaire. The third luminaire may comprise a UV light source emitting the third UV light beam 220 and a white light source emitting the third white light beam 240, where the third UV light beam is angled relative to a vertical axis and directed towards the target area 5, and the third white light beam 240 is directed along the vertical axis. Likewise, the fourth luminaire may comprise a UV light source emitting the fourth UV light beam 220, and a white light source emitting the fourth white light beam 240, where the fourth UV light beam is angled relative to a vertical axis and directed towards the target area 5 and the fourth white light beam 340 is directed along the vertical axis. The angle in which the first UV light beam 22 is directed towards the target area 5 relative to the vertical may be equal to the angle with which the second UV light beam 32, the third UV light beam 220 and the fourth UV light beam 320 are angled towards the target area 5 relative to the vertical.

As mentioned, the target area 5 may form part of a floor 6. The target area 5 may also be formed by an object, such as a table or a chair, placed on the floor 6. More generally, the target area 5 forms part of a surface 6, and the surface 6 may be a surface of any feasible object, such as a piece of furniture, a tool or electronic equipment, that it is desired to disinfect.

The light emitting system 1 shown in FIG. 1 may also be configured to provide a collimated UV light pattern superimposed on top of or complementary to a UV light spot or a diffuse UV light spot. Such a light emitting system 1 comprises a first luminaire 2 and a second luminaire 3. The first luminaire 2 comprises a UV light source 21 emitting a first UV light beam 22 having a first spectral distribution. The second luminaire 3 comprises a UV light source 31 emitting a second UV light beam 32 having a second spectral distribution different from said first spectral distribution. The first UV light beam 22 is collimated by a collimator, such as a lens, and is directed onto an optical structure, such as a diffractive grating, to obtain a desired UV light pattern. The second UV light beam 32 is collimated by a collimator, such as a reflector, to obtain a UV light spot. The UV light pattern obtained from the first UV light beam 22 is superimposed on top of the UV light spot obtained from the second UV light beam 32. In this way, edges of one or more objects, e.g. a table and chairs around the table, may be irradiated with a higher UV intensity and/or with UV light having a shorter UV wavelength range as compared to other areas, such as particularly a central area of the object, e.g. the table. Thus, areas which needs more disinfection are irradiated with more powerful disinfection light. Collimating the first UV light beam 22 and the second UV light beam 32 further provides for an improved targeting precision.

Due to the above effect, such a light emitting system 1 configured to provide a collimated UV light pattern superimposed on top of or complementary to a UV light spot or a diffuse UV light spot may also be useful in rooms where different materials with different sensibility for different types of UV radiation are present. It is then essential that irradiation of materials sensible for a specific UV radiation are not exposed to said specific UV radiation. Yet, it should remain possible to disinfect all the materials such that they may be kept virus free, and hence to irradiate all materials with suitable disinfection lighting. Such a light emitting device enables to provide specific patterns of specific UV radiation so that materials are only exposed to disinfection lighting they are able to withstand. For example, the whole room and all materials are exposed to the diffuse low intensity long wavelength UV light, to keep the room basically disinfected, while only materials that are able to withstand the high intensity short wavelength UV light are exposed to said high intensity short wavelength UV light. Alternatively, or additionally, it is envisaged to use a plurality of laser UV sources for providing accurately collimated complementary patterns of different types of UV radiation for the abovementioned purposes.

For such a light emitting system 1 configured to provide a collimated UV light pattern superimposed on top of or complementary to a UV light spot or a diffuse UV light spot, one or more of the following may additionally be provided for.

The intensity difference between the UV light pattern obtained from the first UV light beam 22 and the UV light spot obtained from the second UV light beam 32 may be at least a factor 3, such as to obtain improved disinfection where needed.

The wavelength difference between the UV light pattern obtained from the first UV light beam 22 and the UV light spot obtained from the second UV light beam 32 may be at least 50 nm, such as to obtain improved disinfection effectiveness.

The first UV light beam 22 and the second UV light beam 32 may comprise different types of UV light, where the different types of UV light include violet light (380-420 nm), UV-A (315-380 nm), UV-B (280-315 nm), long-wavelength UV-C (230-280 nm), and Far-UV (190-230 nm).

The first UV light beam 22 may be laser light having a narrow wavelength distribution or a line emission, while the second UV light beam 32 may be LED light having a broader wavelength distribution. As the first UV pattern is easier to make with a UV laser compared to UV LEDs, a better collimation is hereby obtained.

The UV light pattern obtained from the first UV light beam 22 may have a higher resolution as compared to the UV light spot obtained from the second UV light beam 32. Thereby an improved targeted disinfection may be obtained.

The UV light pattern obtained from the first UV light beam 22 may have an area at least three times smaller than the area of the UV light spot obtained from the second UV light beam 32.

The UV light spot obtained from the second UV light beam 32 may also be a UV light pattern. In such a configuration, both UV light patterns may be further be complements.

A sensor and a controller may be provided, where the controller controls the first luminaire 2 and particularly the first UV light beam 22 based on input of the sensor. The sensor may e.g. be an occupancy sensor or a motion sensor.

A sensor may be provided and may also be used to detect the material sensibility for different types of UV light, e.g. by using a camera, or more advanced using material analysis such as spectroscopy.

The person skilled in the art realizes that the present invention by no means is limited to the preferred embodiments described above. On the contrary, many modifications and variations are possible within the scope of the appended claims.

For example, light emitting systems comprising another number, such as three or five or more than five, luminaires constructed as described above are also feasible.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A light emitting system configured to emit radiation into a main average direction of emission for disinfecting a target area, the light emitting system comprising:
    a first luminaire comprising a first light source configured to, in operation, emit a first UV light beam towards the target area, and
    a second luminaire comprising a second light source configured to, in operation, emit a second UV light beam towards the target area, wherein
    the first luminaire and the second luminaire are arranged spaced apart at a first distance from one another in a direction perpendicular to the vertical, and wherein
    the first light source and the second light source are arranged such that, in operation, the first UV light beam and the second UV light beam are emitted in such respective directions that the first UV light beam and the second UV light beam form an exposure overlap at the target area,
    wherein the first luminaire further comprises a third light source configured to, in operation, emit a first white light beam towards the target area,
    the second luminaire further comprises a fourth light source configured to, in operation, emit a second white light beam towards the target area, and
    wherein the exposure overlap between the first UV light beam and the second UV light beam measured at FWHM at the target area is at least 50%, at least 70%, at least 80%, at least 90% or at least 95%.

2. A light emitting system according to claim 1, wherein the third light source and the fourth light source are arranged such that, in operation, the first white light beam and the second white light beam are emitted with mutually parallel main directions of propagation.

3. A light emitting system according to claim 1, wherein the first UV light has a first main peak and the second UV light has a second main peak, wherein the first mean peak and the second mean peak differ by at least 50 nm in wavelength.

4. A light emitting system according to claim 3, wherein the spectral distribution of the first main peak and the spectral distribution of the second main peak have a mutual overlap up to but not above 20%.

5. A light emitting system according to claim 1, further comprising at least one further luminaire spaced apart from the first luminaire at a second distance, comprising:
    a fifth light source configured to, in operation, emit a third UV light beam towards the target area,
    the at least one further luminaire is arranged spaced apart from the first luminaire and the second luminaire, and wherein
    the fifth light source being arranged such that, in operation, the third UV light beam, the first UV light beam and the second UV light beam are emitted in such respective directions that the third UV light beam, the first UV light beam and the second UV light beam form the exposure overlap at the target area.

6. A light emitting system according to claim 4, wherein the at least one further luminaire further comprises a sixth light source configured to, in operation, emit a third white light beam towards the target area, the sixth light source being arranged such that, in operation, the third white light beam, the first white light beam and the second white light beam are emitted with mutually parallel main directions of propagation.

7. A light emitting system according to claim 5, wherein an overlap between the first white light beam, the second white light beam and where provided the third white light beam measured at FWHM at the target area is less than 50%, less than 25% or less than 10%.

8. A light emitting system according to claim 1,
    wherein the first luminaire comprises a first light exit surface, and the first luminaire is configured to, in operation, emit the first UV light beam at a first acute angle ($\alpha$), and
    wherein the second luminaire comprises a second light exit surface, and the second luminaire is configured to, in operation, emit the second UV light beam at a second acute angle (β), at least one of α and β is larger than 15° relative to the main issue direction.

9. A light emitting system according to claim 8, wherein α is equal to −β.

10. A light emitting system according to claim 5, wherein the further luminaire comprises a third light exit surface, and the further luminaire is configured to, in operation, emit the third UV light beam at a third acute angle, wherein at least one of the first, second and third acute angle is larger than 15° relative to the main issue direction.

11. A light emitting system according to claim 10, wherein the third acute angle is equal to −α.

12. A light emitting system according to claim 1, wherein the first light source is configured to, in operation, emit light with a first spectral distribution and the second light source is configured to, in operation, emit light with a second spectral distribution being different from the first spectral distribution.

13. A light emitting system according to claim 1, wherein the UV beams has a beam width at FWHM narrower than the beam width at FWHM of the white light beams.

14. A light emitting system according to claim 1, wherein the first luminaire comprises a first light exit surface and has a first spatial light distribution and the second luminaire comprises a second light exit surface and has a second spatial light distribution, wherein the first light exit surface is provided with an electrically and/or mechanically controllable optical element that is arranged to dynamically manipulate the beam with the first spatial light distribution into a beam having a beam direction and a spatial light distribution different from said first spatial light distribution and/or the second light exit surface is provided with an electrically and/or mechanically controllable optical element that is arranged to dynamically manipulate the beam with the second spatial light distribution into a beam having a beam direction and a spatial light distribution different from said second spatial light distribution.

15. A light emitting system according to claim 14, wherein the beam direction/spatial light distributions are adjustable such that in operation an at least partly overlap of the spatial light distribution of the first luminaire and the spatial light distribution of the second luminaire is obtained at a target area or that the adjusted beams are complementary.

* * * * *